June 7, 1938.　　　J. KURELIC　　　2,120,102

MECHANICAL ANIMAL

Filed Oct. 8, 1937　　　2 Sheets—Sheet 1

INVENTOR
JOSEF KURELIC
BY
ATTORNEY

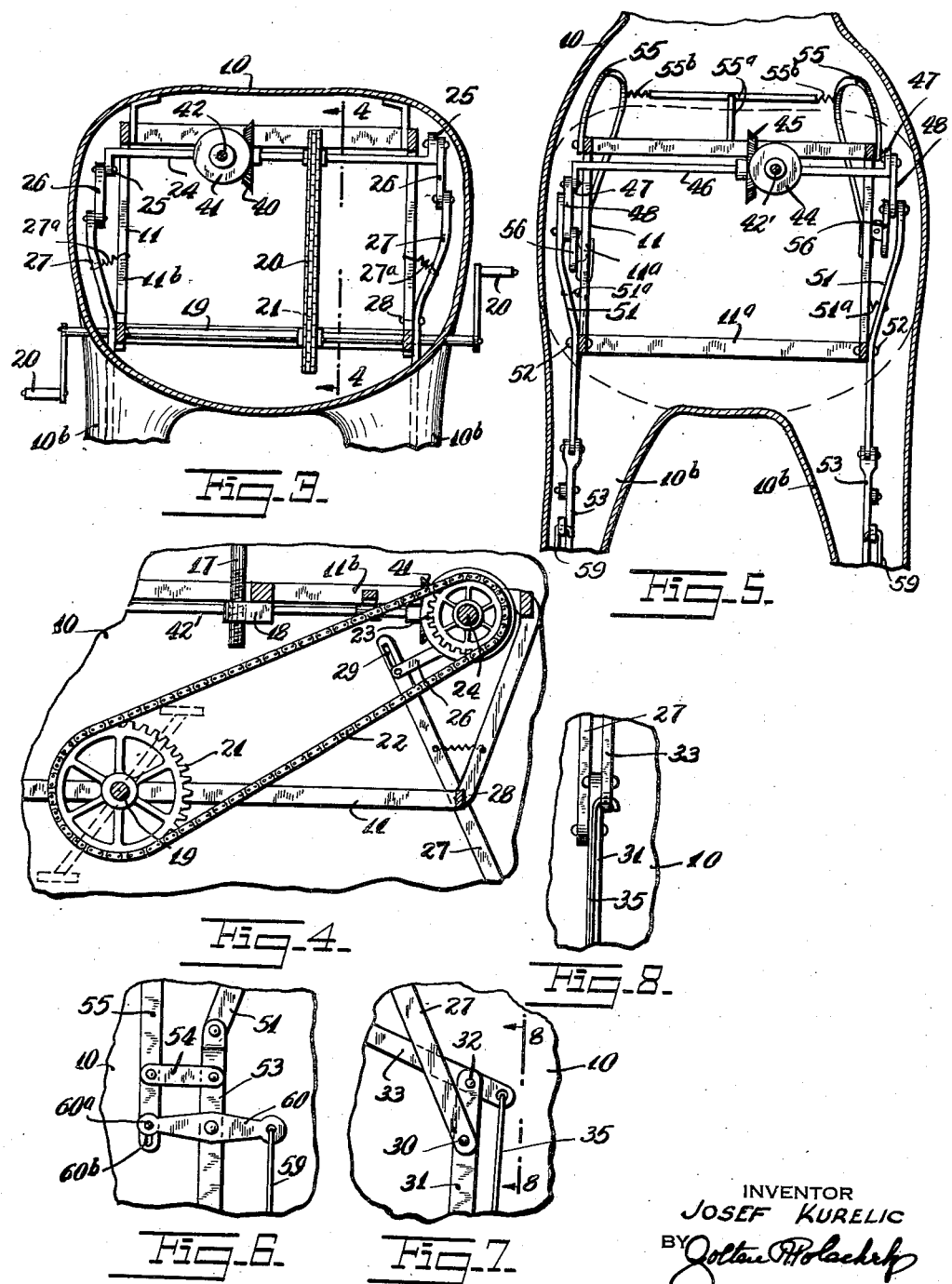
June 7, 1938. J. KURELIC 2,120,102
MECHANICAL ANIMAL
Filed Oct. 8, 1937 2 Sheets-Sheet 2
INVENTOR
JOSEF KURELIC
ATTORNEY Patented June 7, 1938

2,120,102

UNITED STATES PATENT OFFICE 2,120,102

MECHANICAL ANIMAL

Josef Kurelic, Philadelphia, Pa.

Application October 8, 1937, Serial No. 167,876

5 Claims. (Cl. 280—1.17)

This invention relates to new and useful improvements in a mechanical animal.

The invention has for an object the construction of a mechanical animal which is adapted to be ridden by a person for pleasure and excercise. The construction is such that the mechanical animal will go through various gymnastics for exercising the rider.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

Fig. 3 is a fragmentary enlarged vertical sectional view taken on the line 3—3 of Fig. 1.

Fig. 4 is a sectional view taken on the line 4—4 of Fig. 3.

Fig. 5 is a fragmentary enlarged sectional view taken on the line 5—5 of Fig. 1.

Fig. 6 is an enlarged detailed view of a portion of Fig. 1.

Fig. 7 is an enlarged detailed view of another portion of Fig. 1.

Fig. 8 is a fragmentary elevational view looking in the direction of the line 8—8 of Fig. 7.

Figure 1:
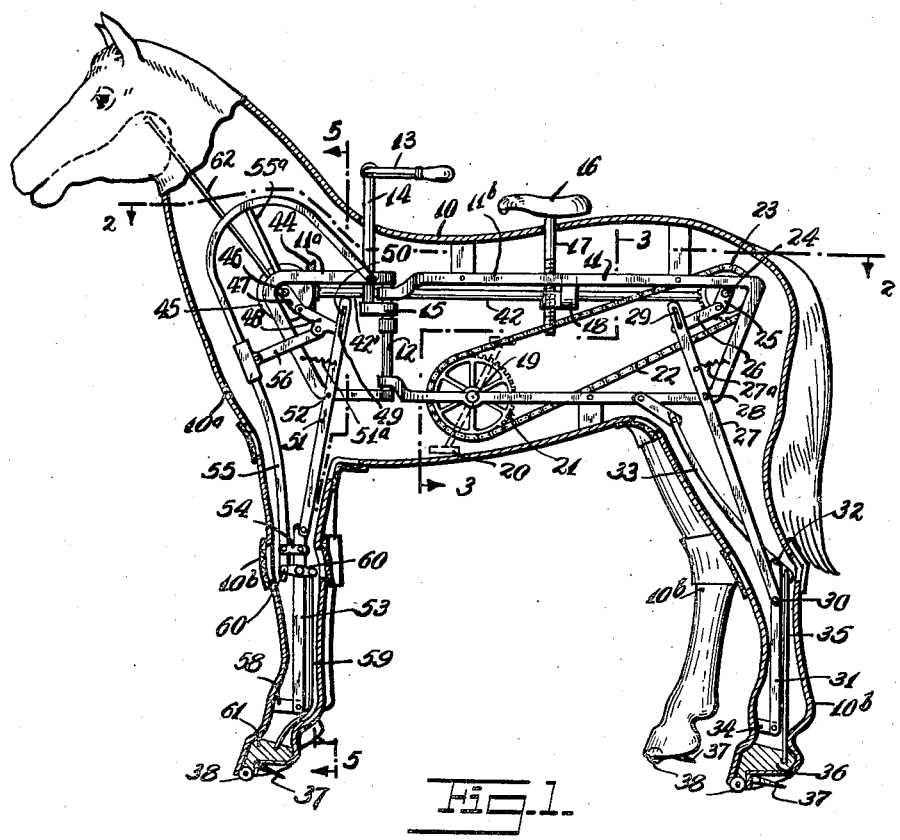
Fig. 1 is a vertical sectional view of a mechanical animal constructed according to this invention.

The mechanical animal, according to this invention, comprises a hollow animal figure 10 of rigid material having a neck portion 10a and legs 10b flexibly constructed at the joints. The arrangement allows the neck to be moved laterally and the legs to bend at the knees and at the junction with the body.

A frame 11 is mounted within the figure 10 and consists of a rigid front portion 11a swivelly connected with a rigid rear portion 11b. The swivel connection between these frame sections are in the vicinity of the neck portion of the animal, which arrangement provides for the lateral movement of the animal's neck and head. A vertical shaft 12 serves as the pintle for the swivel connection of the frame sections. A steering handle 13 is attached upon a vertical shaft 14 secured on an offset lug 15 which is mounted upon the shaft 12. The arrangement is such that the handle 13 may be moved pivotally towards the right, or towards the left, to accomplish the steering. A seat 16 for the user of the device is arranged over the animal's back and is mounted on a vertical rod 17 which threadedly engages in a support 18 mounted on the frame section 11b.

A drive shaft 19 is supported upon the frame section 11b and extends transversely thereof. This drive shaft is provided with foot pedals 20. A sprocket 21 is fixed upon the drive shaft 19 and connects with a chain 22 extending over the rear sprocket 23 fixed on a rear shaft 24. This rear shaft is rotatively mounted in the rear portion of the frame section 11b. The ends of the shaft 24 are provided with cranks 25 connecting with links 26 associated with the top ends of hind leg levers 27. These hind leg levers are pivotally mounted intermediate of their ends at the points 28 upon the rear frame section and are maintained in a neutral position by springs 27a connected with the frame section 11b.

Figure 2:
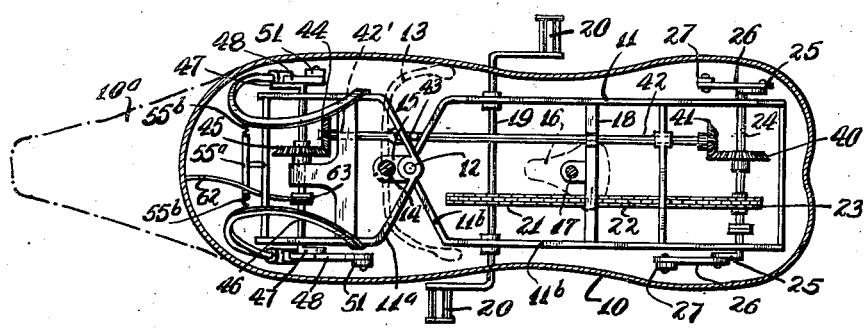
Fig. 2 is a horizontal sectional view taken on the line 2—2 of Fig. 1.

The upper ends of the levers 27 are formed with elongated slots 29, see Fig. 1, in which pins from the links 26 engage. The lower ends of the levers 27 pivotally connect at the points 30 with levers 31 pivotally supported at their upper ends 32 upon braces 33 attached on the frame section 11b. The lower ends of the levers 31 are pivotally connected with blocks 34 attached to the hind legs of the figure. Rods 35 are pivotally attached at their top ends upon the braces 33 and extend substantially parallel to the rods 31 and at the lower ends are pivotally connected with the hoof portions 36 of the figure. These hoof portions are provided with rearward extending ratchets 37 allowing free forward motion, but interfering with free rearward motion. Casters 38 are mounted upon the bottom of the rear legs to facilitate their movements along the ground. A bevel gear 40 is mounted on the transverse shaft 24 and meshes with a bevel gear 41 upon a longitudinal shaft 42 which is rotatively supported on the frame. This longitudinal shaft is connected by a universal joint 43 with a small extension shaft piece 42', see Fig. 2. The extension shaft 42' is provided with a bevel gear 44 meshing with a bevel gear 45 upon a transverse front shaft 46. This front shaft is rotatively supported in the front frame section 11a. The universal 43 permits a relative bending of the shaft sections, as is required for the proper motion of the neck and head of the animal figure.

The ends of the shaft 46 are provided with cranks 47 which are pivotally connected with links 48. The free ends of the links 48 have pins 49, see Fig. 1, engaging in elongated slots 50 in front leg levers 51. These front leg levers 51 are pivotally mounted intermediate at 52 upon the frame section 11ª and are urged into neutral positions by springs 51ª connected with the frame section 11ª. The lower ends of the levers 51 pivotally connect with lever extensions 53. These extensions are pivotally mounted on braces 54 supported on a flexible frame section 55. This flexible frame section extends up from the front legs into the neck area and is resiliently connected with the frame section 11ª by a T-shape support 55ª and springs 55ᵇ.

A support link 56 is interposed between the flexible frame section 55 and the link 48. The link 56 is pivotally connected with these parts. The lower ends of the levers 53 are pivotally mounted on blocks 58 secured within the front legs of the animal. Rods 59 are pivotally connected at their upper ends upon braces 60 pivotally connected with the levers 53 and connecting the flexible frame 55 by pins 60ª working in slots 60ᵇ. These rods 59 pivotally connect with the front hoofs 61. The front hoofs 61 are also provided with ratchets 37 and casters 38. A radial support piece 62 is attached upon the head of the animal and is supported at its lower end by a bearing 63 through which the shaft 46 passes.

The operation of the device is as follows:—
The rider sits on the seat 16 and with the feet operates the pedals 20. This causes the shaft 19 to rotate. This rotation is transmitted, first to the shaft 24 and then to the shaft 42 and to the front shaft 46. The rotations of the shafts 24 and 46 serve to move the hind leg levers and the front leg levers so that the legs move and bend.

The levers 27 are pivotally mounted about the points 28. The upper ends of the levers will be oscillated by the cranks 25 and the links 26. This will cause the lower ends of the levers 27 to travel through specific arcs. This motion is transmitted to the levers 31 which cause the lower portions of the hind legs to swing in arcs. The legs will make some progress forwards upon the ground during the swinging operation and also the swinging or bending of the legs will produce a gymnastic motion, up and down.

The rotations from the front shaft 46 will serve to oscillate the levers 51. These levers pivot about the points 52. The upper ends of the levers 51 are moved by the cranks 47 and the links 48. The links 56 will restrain the amplitude of the motion of the levers 51 and will cause a bending of the flexible frame 55. This will cause the legs to move longitudinally. The flexible frame 55 is formed with top bends to facilitate the flexibility thereof. The pivoting of the levers 51 will cause the front legs to pivot correspondingly. The pivoting of the levers 51 will be somewhat modified by the pivoting of the levers 53 which pivots substantially similar to the pivoting of the levers 51.

The rods 35 and 59 will serve to either retard or deflect or bend the hoofs relative to the legs. Thus, there will be a separate hoof action which corresponds with a toe movement. The front legs will swing in arcs and bend, which will cause the front part of the figure to sway and move. The animal, during the gymnastics, will make progress forward since it is restrained by the ratchets 37 against rearward motion.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A mechanical animal, comprising a hollow animal figure of rigid material and having the neck portion and legs thereof flexibly jointed, a frame mounted within said figure and consisting of rigid front and rigid rear sections swivelly connected at the neck portion of the figure so that the neck portion may bend to steer the device, a handle connected with the front frame section, a seat for a person mounted on the rear frame section, a drive shaft on the rear frame section, foot pedals for turning said drive shaft, a transverse rear crank shaft mounted on said frame, a transverse front crank shaft mounted on said frame, drive means for connecting the drive shaft with the rear shaft, drive means for connecting said rear and front drive shafts and including a flexible coupling at the junction of the front and rear frame sections, and a leverage system for bending and moving the front and rear legs operated from said front and rear shafts, casters being mounted upon the bottoms of the legs of the figure, and ratchets being arranged on the bottom of the legs in the vicinity of the casters to restrain rear motion of the legs.

2. A mechanical animal, comprising a hollow animal figure of rigid material and having the neck portions and legs thereof flexibly jointed, a frame mounted within said figure and consisting of rigid front and rigid rear sections, swivelly connected at the neck portion of the figure so that the neck portion may bend to steer the device, a handle connected with the front frame section, a seat for a person mounted on the rear frame section, a drive shaft on the rear frame section, foot pedals for turning said drive shaft, a transverse rear crank shaft mounted on said frame, a transverse front crank shaft mounted on said frame, drive means for connecting the drive shaft with the rear shaft, drive means for connecting said rear and front drive shafts and including a flexible coupling at the junction of the front and rear frame sections, and a leverage system for bending and moving the front and rear legs operated from said front and rear shafts, including a ratchet arm mounted on said frame and extending into the hind legs, pivoted hind leg levers mounted upon the frame and having upper ends actuated by links connected with said cranks, the lower ends of said levers being connected with levers pivotally mounted on braces and their upper ends, the lower ends of the latter levers being connected with the legs.

3. A mechanical animal, comprising a hollow animal figure of rigid material and having the neck portion and legs thereof flexibly jointed, a frame mounted within said figure and consisting of rigid front and rigid rear sections swivelly connected at the neck portion of the figure so that the neck portion may bend to steer the device, a handle connected with the front frame section, a seat for a person mounted on the rear frame section, a drive shaft on the rear frame section, foot pedals for turning said drive shaft, a transverse rear crank shaft mounted on said frame, a transverse front crank shaft mounted on said frame, drive means for connecting the drive shaft with the rear shaft, drive means for connecting said rear and front drive shafts and including a flexible coupling at the junction of the front and rear frame sections, and a leverage system for bending and moving the front and rear legs operated from said front and rear shafts, including a ratchet arm mounted on said frame and extending into hind legs, pivoted hind leg levers mounted upon the frame and having upper ends actuated by links connected with said cranks, the lower ends of said levers being connected with levers pivotally mounted on braces and their upper ends, the lower ends of the latter levers connected with the legs, and rods connected with said braces and with hoof portions of the legs.

4. A mechanical animal, comprising a hollow animal figure of rigid material and having the neck portion and legs thereof flexibly jointed, a frame mounted within said figure and consisting of rigid front and rigid rear sections swivelly connected at the neck portion of the figure so that the neck portion may bend to steer the device, a handle connected with the front frame section, a seat for a person mounted on the rear frame section, a drive shaft on the rear frame section, foot pedals for turning said drive shaft, a transverse rear crank shaft mounted on said frame, a transverse front crank shaft mounted on said frame, drive means for connecting the drive shaft with the rear shaft, drive means for connecting said rear and front drive shafts and including a flexible coupling at the junction of the front and rear frame sections, and a leverage system for bending and moving the front and rear legs operated from said front and rear shafts, including a flexible frame mounted upon the front frame section, levers pivotally supported on the front frame section and oscillated by links connected with the front cranks, said levers extending downwards into the front legs and pivotally connected with other levers pivotally supported on said flexible frame.

5. A mechanical animal, comprising a hollow animal figure of rigid material and having the neck portion and legs thereof flexibly jointed, a frame mounted within said figure and consisting of rigid front and rigid rear sections swivelly connected at the neck portion of the figure so that the neck portion may bend to steer the device, a handle connected with the front frame section, a seat for a person mounted on the rear frame section, a drive shaft on the rear frame section, foot pedals for turning said drive shaft, a transverse rear crank shaft mounted on said frame, a transverse front crank shaft mounted on said frame, drive means for connecting the drive shaft with the rear shaft, drive means for connecting said rear and front drive shafts and including a flexible coupling at the junction of the front and rear frame sections, and a leverage system for bending and moving the front and rear legs operated from said front and rear shafts, including a flexible frame mounted upon the front frame section, levers pivotally supported on the front frame section and oscillated by links connected with the front cranks, said levers extending downwards into the front legs and pivotally connected with other levers pivotally supported on said flexible frame, and rods connected with the hoof portions of the front legs and with braces connected with said flexible frame.

JOSEF KURELIC.